United States Patent [19]

Rouw

[11] Patent Number: 4,541,668
[45] Date of Patent: Sep. 17, 1985

[54] CYCLE SEAT

[76] Inventor: William Rouw, 223 Carson St., Pella, Iowa 50219

[21] Appl. No.: 618,689

[22] Filed: Jun. 8, 1984

[51] Int. Cl.$^4$ .............................................. B62J 1/00
[52] U.S. Cl. .................................... 297/201; 297/312
[58] Field of Search .......................... 297/201, 312, 195

[56] References Cited

U.S. PATENT DOCUMENTS 603,734   5/1898   Peck et al. ........................ 297/201
1,249,650 12/1917  McPhee et al. ................... 297/378

FOREIGN PATENT DOCUMENTS 3717  of 1897  United Kingdom ................ 297/201
3282  of 1897  United Kingdom ................ 297/201
2116  of 1897  United Kingdom ................ 297/201
15438 of 1897  United Kingdom ................ 297/201

Primary Examiner—James T. McCall
Attorney, Agent, or Firm—Henderson & Sturm

[57] ABSTRACT

A cycle seat of a type having a housing adapted to be attached to a bicycle or tricycle. A first buttock-supporting member having a front end and a rear end thereof is pivotally attached to the rear end of the first buttock-supporting member, and a second buttock-supporting member having a front and a rear end thereof is pivotally attached at the rear end thereof to the housing along a substantially horizontal axis. A coordinating apparatus is provided for supporting bottom portions of the first and second buttock-supporting members and including an elongated member pivotally attached intermediate the ends thereof along a substantially transverse axis which is disposed generally transversely to and lower than the other horizontal axes. Bearing structures are disposed on each end of elongated members for supporting respective bottom portions of the first and second buttock-supporting members whereby when the front end of one of the buttock-supporting members moves downwardly by a certain distance, the front end of the other buttock-supporting member will move upwardly by a proportional amount.

6 Claims, 6 Drawing Figures

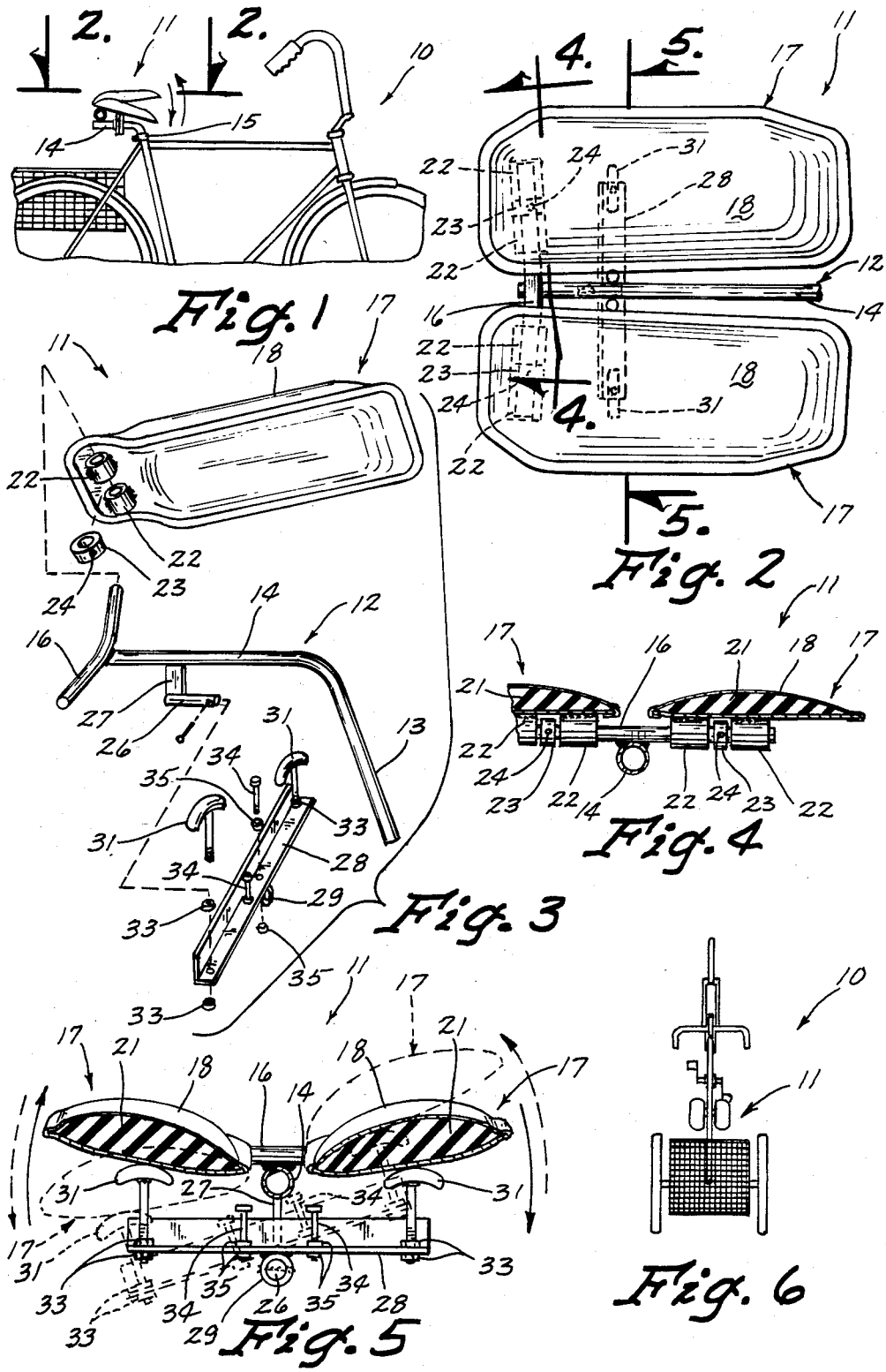

CYCLE SEAT

TECHNICAL FIELD

The present invention relates generally to cycles having foot operated pedals and more particularly to seats for such cycles.

BACKGROUND ART

It is well-known that most bicycle seats are substantially fixed and rigid in use, despite having various adjustments which can be made to place them in whatever fixed position is desired. One of the problems with such conventional bicycle seats is that they do not provide support for the bicycle rider where it is most needed. Furthermore, these seats are uncomfortable and tend to cause rubbing of a person's body against such seat during pedaling of such bicycle.

These problems have been recognized for some time, and U.S. Pat. No. 4,387,925 to Barker, et al., refers to the aforementioned problems and some other problems with conventional bicycle seats. This last mentioned patent goes on to propose a solution to these problems having a pair of buttock supporting seat portions which are pivotally attached along the horizontal axis to a housing attached to a bicycle. While many of the disadvantages of conventional bicycle seats are solved by the solution proposed in the aforementioned Baker, et al., patent, one of the problems with such proposed solution is that during the pedaling process and the resulting pivoting of the buttock supporting cushions these support cushions move the buttocks forwardly and rearwardly during the pivoting process. This results in an undesirable twisting of the rider's torso during the process of pedaling a bicycle utilizing such a bicycle seat design.

Accordingly, there is a need for an improved bicycle seat apparatus which overcomes all of the aforementioned problems.

DISCLOSURE OF THE INVENTION

The present invention relates to a bicycle or tricycle seat of a type having a housing adapted to be attached to a cycle. A first buttock-supporting member having a front end and a rear end thereof is pivotally attached to the rear end of the first buttock-supporting member, and a second buttock-supporting member having a front and a rear end thereof is pivotally attached at the rear end thereof to the housing along a substantially horizontal axis. A coordinating apparatus is provided for supporting bottom portions of the first and second buttock-supporting members and including an elongated member pivotally attached intermediate the ends thereof along a substantially transverse axis which is disposed generally transverse to and lower than the other horizontal axes. Bearing structures are disposed on each end of elongated members for supporting respective bottom portions of the first and second buttock-supporting members whereby when the front end of one of the buttock-supporting members moves downwardly by a certain distance, the front end of the other buttock-supporting member will move upwardly by a proportional amount.

An object of the present invention is to provide an improved bicycle seat.

Another object of the invention is to provide a bicycle seat which eliminates twisting of the torso of a bicycle rider while pedaling the bicycle.

A further object of the invention is to reduce frictional contact of the bicycle rider's body with respect to the bicycle seat as much as possible.

Other objects, advantages and novel features of the present invention will become apparent from the following detailed description of the invention when considered in conjunction with the accompanying drawings.

BRIEF DESCRIPTION OF THE DRAWINGS

FIG. 1 shows a side elevational view of a tricycle or bicycle having a seat constructed in accordance with the present invention attached thereto;

FIG. 2 is a top plan view of the bicycle seat of the present invention (enlarged) taken along line 2—2 of FIG. 1;

FIG. 3 is an exploded partial perspective view of the preferred embodiment of the invention;

FIG. 4 is a cross-sectional view taken along line 4—4 of FIG. 2;

FIG. 5 is a cross-sectional view taken along line 5—5 of FIG. 2 and showing movement of the bicycle seat between solid and dashed lines; and FIG. 6 is a top elevational veiw of the tricycle shown in FIG. 1.

BEST MODE FOR CARRYING OUT THE INVENTION

Referring now to the drawings wherein like reference numerals designate identical or corresponding parts throughout the several views, FIG. 1 shows a tricycle (10) having a seat (11) constructed in accordance with the present invention attached thereto. A housing (12) as can best be seen in FIG. 3 is attached to the cycle (10) by a standard bracket (15) (FIG. 1) in place of a standard cycle seat.

The housing (12) includes a somewhat vertical portion (13) and a somewhat horizontal portion (14). At the rear of the horizontal portion (14) is attached, such as by welding, a transverse member (16). A buttock-supporting member (17) includes a padded top cover (18) attached at the edges to a bottom rigid sheet metal member (19) and has a padding material (21) disposed therebetween. Bearing members (22) are rigidly attached to the rear portion of the buttock-supporting member (17), for example by welding (FIG. 3), and a locking collar (23) having an allen screw type of set screw (24) is utilized to lock the bearing members (22) onto the shaft (16) as can readily be seen in FIG. 4.

A horizontal mounting shaft (26) which is substantially parallel to the horizontal housing (14) is rigidly attached to such horizontal housing portion (14) by a member (27), which is welded to the housing element (14) on the top thereof and to the shaft (26) at the bottom thereof. An elongated member (28) having a bearing member (29) welded to the bottom thereof (FIG. 5) is pivotally disposed onto the shaft (26) whereby the elongated member (28) can pivot in the fashion shown in solid and dashed lines in FIG. 5. The support button (31) is disposed under each of the rigid portions (19) of the buttock-supporting members (17), and these button supports (31) are welded to a bolt (32) which is, in turn, bolted to elongated member (28) by nuts (33).

In a similar fashion, stop bolts (34) are attached to the elongated member (28) by use of nuts (35) which are threadably engaged thereon.

In operation, a rider of the tricycle (10) shown in FIGS. 1 and 6 would mount the tricycle in a conventional fashion except that the buttocks of the rider are supported by the buttock-supporting members (17) instead of by a one piece seat. During the pedaling operation, as the right leg is extended, the rightmost one of the buttock-supporting members (17) will move downwardly in response thereto and at the same time that the right leg is extended, the left leg will be moving upwardly by a proportional amount. Similarly, the leftmost buttock-supporting member (17) will also be moving upwardly in proportion to the movement downwardly of the rightmost buttock-supporting member (17) so that as the tricycle is pedaled, the buttock-supporting member (17) will naturally follow and support the buttocks and extreme upper portion of the legs.

It is noted by referring to FIG. 5 that as the buttock-supporting member (17) moves from the position shown in solid lines upwardly to the position shown in dashed lines, that the movement of the elongated member (29) moves accordingly to the point wherein the stop bolt (34) will contact the horizontal portion (14) of the housing (12). This prevents further upward movement of the buttock-supporting member (17) and elongated member (28) on the right side as viewed from FIG. 5. Similarly, when the leftmost buttock-supporting member (17) moves from the position shown in solid lines in FIG. 5 to an extreme upward position, the leftmost stop bolt (34) will contact the housing member (14) and prevent further upward movement. It will be appreciated by those skilled in the art that the stop bolts (34) can be adjusted by turning them in one direction or the other to lengthen or shorten the effective length thereof and that this adjustment will adjust the extent of the upward movement of that corresponding side of the buttock-supporting members (17) and at the same time will control the extent that the opposite side of buttock-supporting member (17) will move downwardly. Accordingly, the bicycle seat (11) of the preferred embodiment can be adapted to any particular bicycle or tricycle and to any individual riding such cycle.

It will therefore be appreciated that the best mode (11) of the present invention disclosed herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. A bicycle or tricycle seat comprising:
   a housing adapted to be attached to a bicycle;
   a first buttock-supporting member having a front end and a rear end thereof;
   means for operably pivotally attaching said rear end of first buttock-supporting member to said housing along a substantially horizontal axis;
   a second buttock-supporting member having a front end and a rear end thereof;
   means for operably pivotally attaching said rear end of said second buttock-supporting member to said housing along a substantially horixontal axis;
   coordinating means for supporting bottom portions of said first and second buttock-supporting member forwardly of said horizontal axes, said coordinating member comprising an elongated member pivotally attached intermediate the ends thereof along a substantially horizontal axis which is disposed generally transversely to and lower than said other horizontal axes, first support means disposed toward one end of said elongated member for supporting said bottom portion of said first buttock-supporting member, and second support means disposed toward the other end of said elongated member for supporting said bottom portion of the other of said second buttock-supporting member whereby when the front end of one of said buttock-supporting member moves downwardly by a certain distance, the front end of the other said buttock-supporting member will move upwardly by aproportional distance;
   the underside of said first and second buttock-supporting members being rigid and said first and second support means being in slideable contact with the underside of the respective first and second buttock-supporting members;
   stop means for limiting the degree of pivoting of said elongated member;
   first pitch adjustment means associated with said first supporting means for selectively adjusting the distance between the underside of said elongated member and the underside of said first buttock-supporting members; and
   second pitch adjustment means associated with said second supporting means for selectively adjusting the distance between said elongated member and the underside of said second buttock-supporting member.

2. The seat of claim 1 wherein the underside of said first and second buttock-supporting members are rigid and said first and second means are in contact with the underside of respective first and second buttock-supporting members.

3. The seat of claim 1, including stop means for limiting the degree of pivoting of said elongated member.

4. The seat of claim 1, wherein said stop means includes means for adjusting the position stop means for thereby adjusting the degree of pivoting of said elongated member.

5. The seat of claim 4, wherein said stop means comprises a first bolt threadably attached to said elongated member and disposed between said lowermost horizontal axis and said first means, said first bolt being positioned to contact said housing to prevent further pivoting of said elongated member in one pivotal direction and a second bolt threadably attached to said elongated member and disposed between said lowermost horizontal axis and said second support means, and said second bolt being positioned to contact said housing to prevent further pivoting of said elongated member in the other pivotal direction.

6. The seat of claim 1 wherein said first pitch adjustment means includes analog means for threadably attaching said first support means on one end thereof to one end of said elongated member; and said second pitch adjustment means includes analog means for threadably attaching said second support means on one end thereof to the other end of said elongated member.

* * * * *